United States Patent
Ahn et al.

(10) Patent No.: US 11,187,840 B1
(45) Date of Patent: Nov. 30, 2021

(54) OPTICAL FIBER APPARATUS CORRESPONDING TO ENVIRONMENTAL CONDITION AND LAMP MODULE WITH OPTICAL FIBER APPARATUS CORRESPONDING TO ENVIRONMENTAL CONDITION

(71) Applicants: Hyundai Motor Company, Seoul (KR); Kia Motors Corporation, Seoul (KR)

(72) Inventors: Byoung Suk Ahn, Gwacheon-si (KR); Jung Wook Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/095,126

(22) Filed: Nov. 11, 2020

(30) Foreign Application Priority Data

Jul. 14, 2020 (KR) .......................... 10-2020-0087011

(51) Int. Cl.
*B60Q 3/62* (2017.01)
*F21S 41/20* (2018.01)
*F21S 8/00* (2006.01)
*G02B 6/44* (2006.01)
*F21V 8/00* (2006.01)

(52) U.S. Cl.
CPC .............. *G02B 6/001* (2013.01); *B60Q 3/62* (2017.02); *F21S 41/28* (2018.01); *G02B 6/0005* (2013.01); *G02B 6/4478* (2013.01); *G02B 6/4495* (2013.01)

(58) Field of Classification Search
CPC ......... B60Q 3/62; F21S 41/28; G02B 6/0005; G02B 6/001; G02B 6/4478; G02B 6/4495
See application file for complete search history.

(56) References Cited

U.S. PATENT DOCUMENTS

| 6,718,078 B2* | 4/2004 | Gauthier | G01L 3/12 250/227.16 |
| 9,834,138 B2* | 12/2017 | Asada | G02B 6/0008 |
| 10,611,300 B2* | 4/2020 | Buelow | B60Q 3/62 |
| 2016/0103261 A1* | 4/2016 | Bauco | G02B 6/0003 362/552 |

FOREIGN PATENT DOCUMENTS

| EP | 3311064 A1 | 4/2018 |
| JP | 2005-019155 A | 1/2005 |
| KR | 10-2014-0109665 A | 9/2014 |

* cited by examiner

*Primary Examiner* — Ryan A Lepisto
(74) *Attorney, Agent, or Firm* — Morgan, Lewis & Bockius LLP

(57) ABSTRACT

An optical fiber apparatus corresponding to an environmental condition and a lamp module with the optical fiber apparatus corresponding to the environmental condition may include an optical fiber, in which the movement of the optical fiber is guided upon a change in the length of the optical fiber by a high temperature or low temperature environmental condition such that the change in the length thereof is absorbed, preventing damage due to the change in the length of the optical fiber to improve durability.

15 Claims, 7 Drawing Sheets

OPTICAL FIBER APPARATUS CORRESPONDING TO ENVIRONMENTAL CONDITION AND LAMP MODULE WITH OPTICAL FIBER APPARATUS CORRESPONDING TO ENVIRONMENTAL CONDITION

CROSS REFERENCE TO RELATED APPLICATION

The present application claims priority to Korean Patent Application No. 10-2020-0087011 filed on Jul. 14, 2020, the entire contents of which is incorporated herein for all purposes by this reference.

BACKGROUND OF THE PRESENT INVENTION

Field of the Invention

The present invention relates to an optical fiber apparatus corresponding to an environmental condition and a lamp module with the optical fiber apparatus corresponding to the environmental condition, which absorb a change in the length of an optical fiber by high temperature or low temperature environmental condition, preventing damage to the optical fiber.

Description of Related Art

Generally, a vehicle is provided with a lighting apparatus for making objects in a traveling direction upon traveling at night visible and for notifying other vehicles or other road users of a traveling state of a driver's vehicle.

In addition to the use of notifying the traveling state, design elements are important in such a lighting apparatus. That is, since the image of a vehicle is changed according to a lighting image through the lighting apparatus, the advanced lighting image through the lighting apparatus is needed.

Therefore, in recent years, various lighting apparatuses using an optical fiber are being developed. The optical fiber emits the light incident thereon to the outside, and is made of a flexible material, implementing various lighting images.

However, the optical fiber is fixed to be applied to the lighting apparatus, and the length thereof is changed according to a change in outside environment. That is, if the outside environment is a high temperature condition, there may be a problem in that an installation location is changed as the optical fiber is stretched. Furthermore, if the outside environment is a low temperature condition, there is a problem in that the optical fiber is broken or crack is generated therein as the optical fiber is contracted.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an optical fiber apparatus corresponding to an environmental condition and a lamp module with the optical fiber apparatus corresponding to the environmental condition, which absorb a change in the length of an optical fiber by a high temperature or low temperature environmental condition, preventing damage to the optical fiber.

An optical fiber apparatus corresponding to an environmental condition according to various exemplary embodiments of the present invention for achieving the object includes: an optical fiber having a first end portion connected to a light source to emit light to an outside of the optical fiber when the light of the light source is incident on the first end portion of the optical fiber; a fixing joint connected to a first mid portion of the optical fiber to limit a behavior of the optical fiber, and having a first side operating as a lighting invalid section and a second side operating as a lighting valid section with respect to a connection point in a lighting section of the optical fiber; a guide joint connected to a second mid portion of the optical fiber and allowing the optical fiber to pass therethrough to permit the behavior of the optical fiber, and having one side operating as the lighting valid section and another side operating as the lighting invalid section with respect to the connection point in the lighting section of the optical fiber; and a bending induction portion mounted in the lighting invalid section of the optical fiber as the first side of the fixing joint or another side of the guide joint, and configured to induce a bending deformation of the optical fiber to absorb stretch or contraction of the optical fiber by an outside environment.

The optical fiber apparatus corresponding to the environmental condition may further include a fixation joint spaced from the guide joint toward a second end portion of the optical fiber and connected to the second end portion of the optical fiber to limit the behavior of the optical fiber, in which the bending induction portion is provided such that the optical fiber is wound to bend and deform the optical fiber.

The optical fiber is wound around the bending induction portion such that a separation space is formed between the optical fiber and the bending induction portion.

The bending induction portion is formed in a circular shape.

Meanwhile, a lamp module with the optical fiber apparatus corresponding to an environmental condition includes: a bracket having one end portion thereof and the other end portion formed to be spaced from each other, and having a light source configured to radiate light formed on one end portion thereof; an optical fiber having a first end portion connected to the light source to emit light to an outside of the optical fiber when the light of the light source is incident on the first end portion of the optical fiber; a fixing joint provided on the second end portion of the bracket and connected to the second end portion of the optical fiber to limit a behavior of the optical fiber, and having a first side operating as a lighting invalid section and a second side operating as a lighting valid section with respect to a connection point in a lighting section of the optical fiber; a guide joint provided on the second end portion of the bracket and connected to allow the optical fiber to pass therethrough to permit the behavior of the optical fiber, and having one side operating as the lighting valid section and another side operating as the lighting invalid section with respect to the connection point in the lighting section of the optical fiber; and a bending induction portion mounted in the lighting invalid section of the optical fiber on the one end portion or the other end portion of the bracket, and configured to induce a bending deformation of the optical fiber to absorb stretch or contraction of the optical fiber by an outside environment.

The optical fiber is composed of a number of bundles, and the respective optical fibers cross each other, extend in the same direction thereof, or extend curvedly, implementing a lighting image.

The bending induction portion is disposed to be diagonally spaced from the guide joint on the second end portion of the bracket and has the second end portion of the optical fiber fixed such that the second end portion of the optical fiber is curvedly bent and deformed.

When the optical fiber is contracted by the outside environment, a portion of the optical fiber bent by the bending induction portion is configured to be spaced from the bracket.

The lamp module with the optical fiber apparatus corresponding to the environmental condition may further include a support lens mounted through the one end portion and the other end portion of the bracket to support the optical fiber and formed with a seating portion having the optical fiber accommodated thereon to fix a location of the optical fiber.

The lamp module with the optical fiber apparatus corresponding to the environmental condition may further include a cover lens mounted on the bracket to cover the support lens and configured so that the light is transmitted therethrough.

The cover lens has a support portion formed on a cross section facing the support lens, the support portion fixing the location of the optical fiber while surrounding the optical fiber together with the seating portion.

The lamp module with the optical fiber apparatus corresponding to the environmental condition may further include a fixation joint provided to be spaced from the guide joint in the other end direction of the optical fiber on the other end portion of the bracket and connected to the other end portion of the optical fiber to limit the behavior of the optical fiber, in which the bending induction portion is provided so that the optical fiber is wound to bend and deform the optical fiber.

The bending induction portion is formed in a circular shape, and has the optical fiber wound around the bending induction portion to have a separation space with respect to the bending induction portion.

According to the optical fiber apparatus corresponding to the environmental condition and the lamp module with the optical fiber apparatus corresponding to the environmental condition composed of the aforementioned structure, the movement of the optical fiber is guided when the length of the optical fiber is changed by the high temperature or low temperature environmental condition to absorb the change in length, preventing damage due to the change in the length of the optical fiber to improve durability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
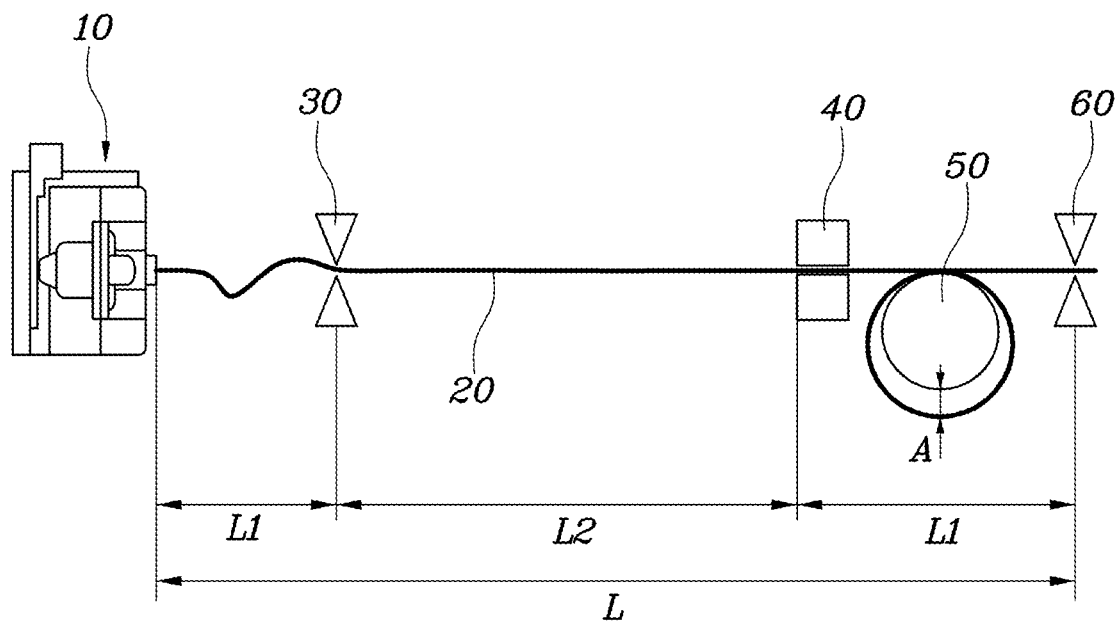
FIG. 1 is a diagram illustrating an optical fiber apparatus corresponding to an environmental condition according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an optical fiber apparatus corresponding to an environmental condition and a lamp module with the optical fiber apparatus corresponding to an environmental condition according to exemplary embodiments of the present invention will be described with reference to the accompanying drawings.

Figure 2:
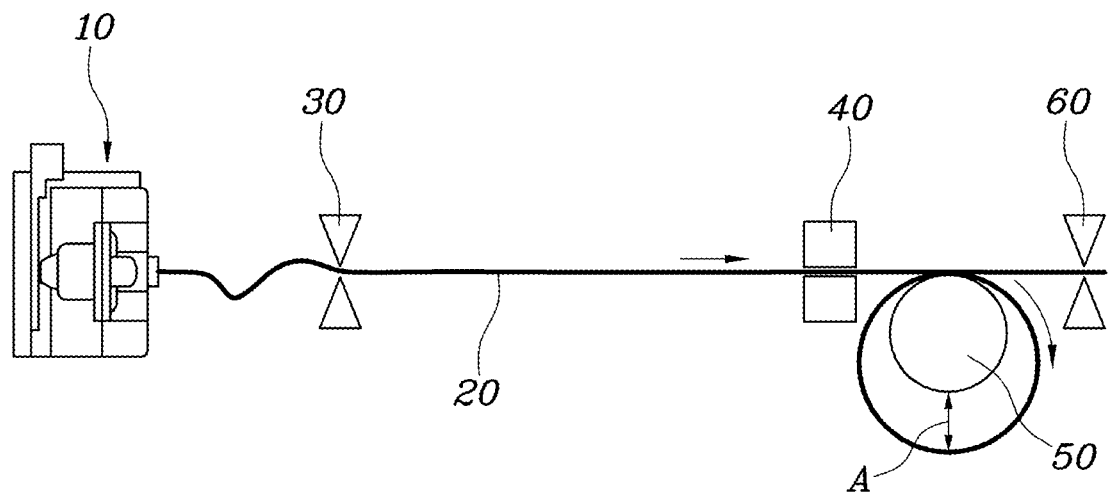
FIG. 2 and FIG. 3 are diagrams for explaining the optical fiber apparatus corresponding to the environmental condition illustrated in FIG. 1.
Figure 3:
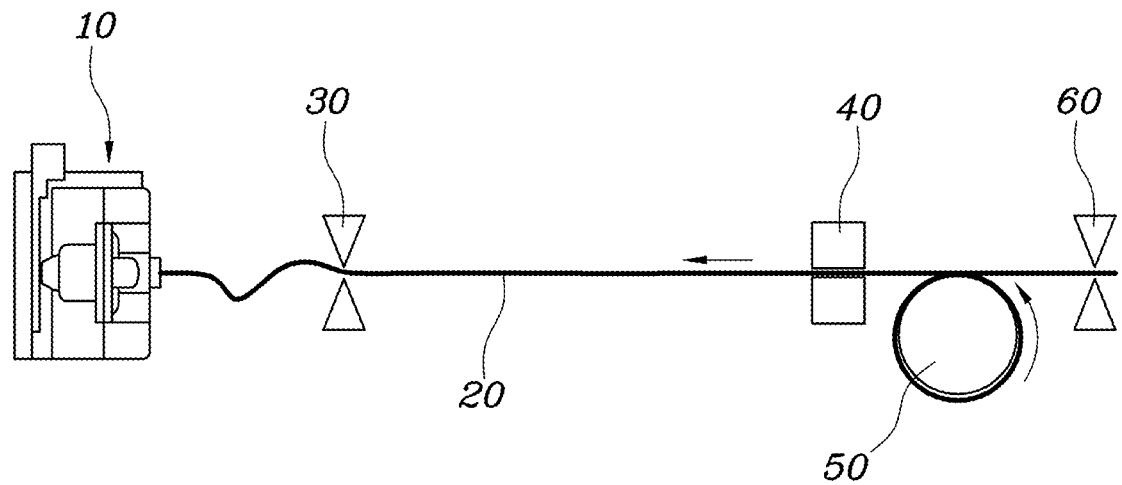
Figure 4:
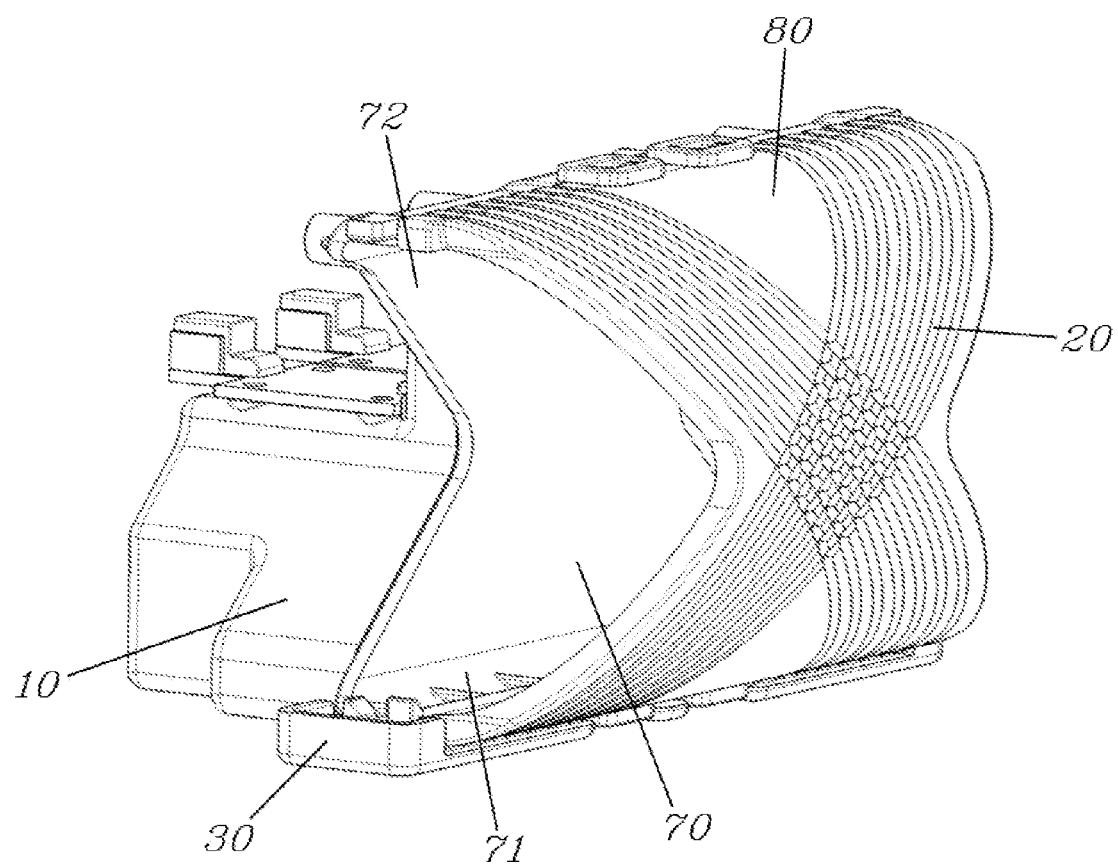
FIG. 4 is a diagram illustrating a lamp module with the optical fiber apparatus corresponding to the environmental condition according to various exemplary embodiments of the present invention.
Figure 5:
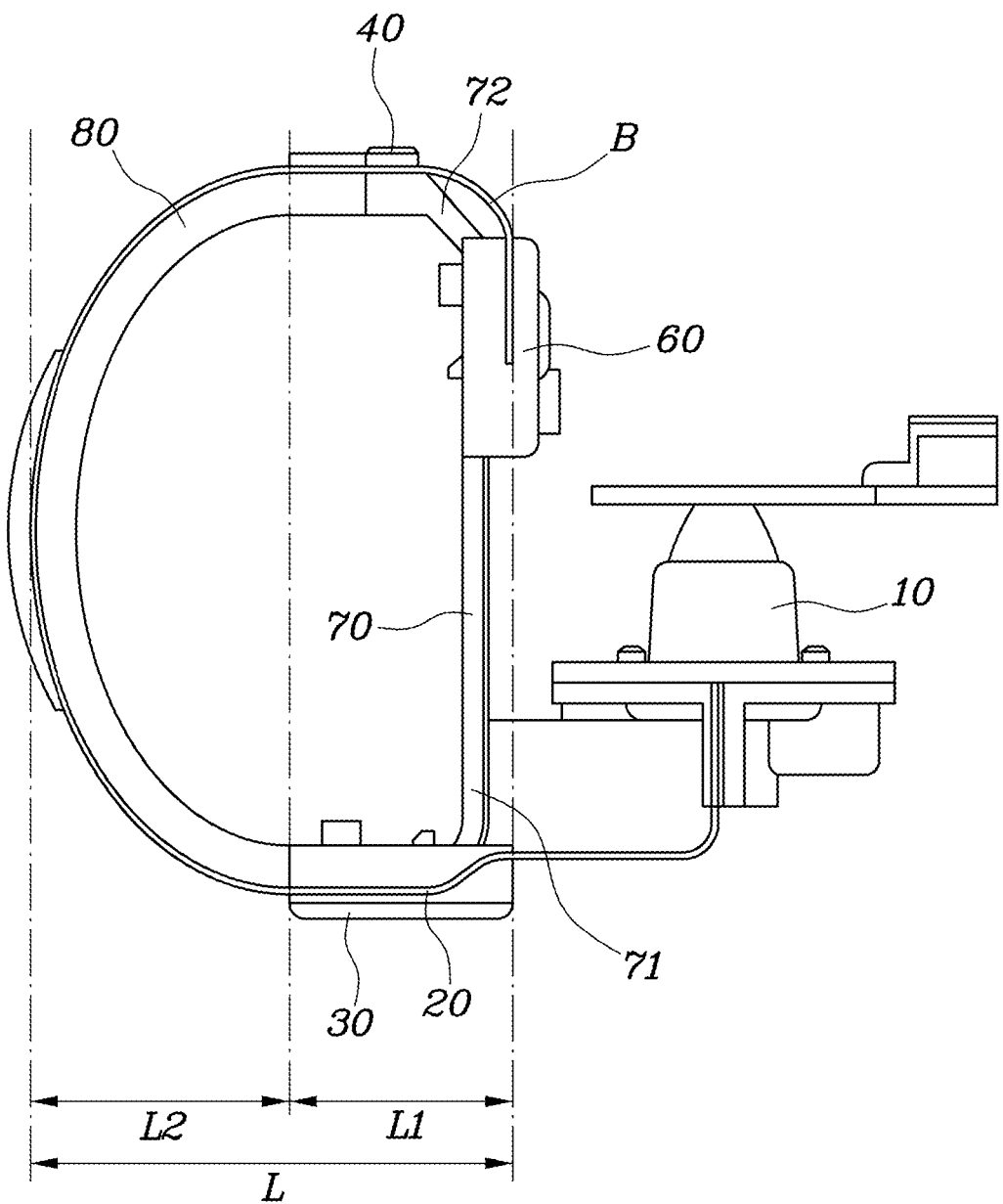
FIG. 5 and FIG. 6 are diagrams for explaining the lamp module with the optical fiber apparatus corresponding to the environmental condition illustrated in FIG. 4.
Figure 6:
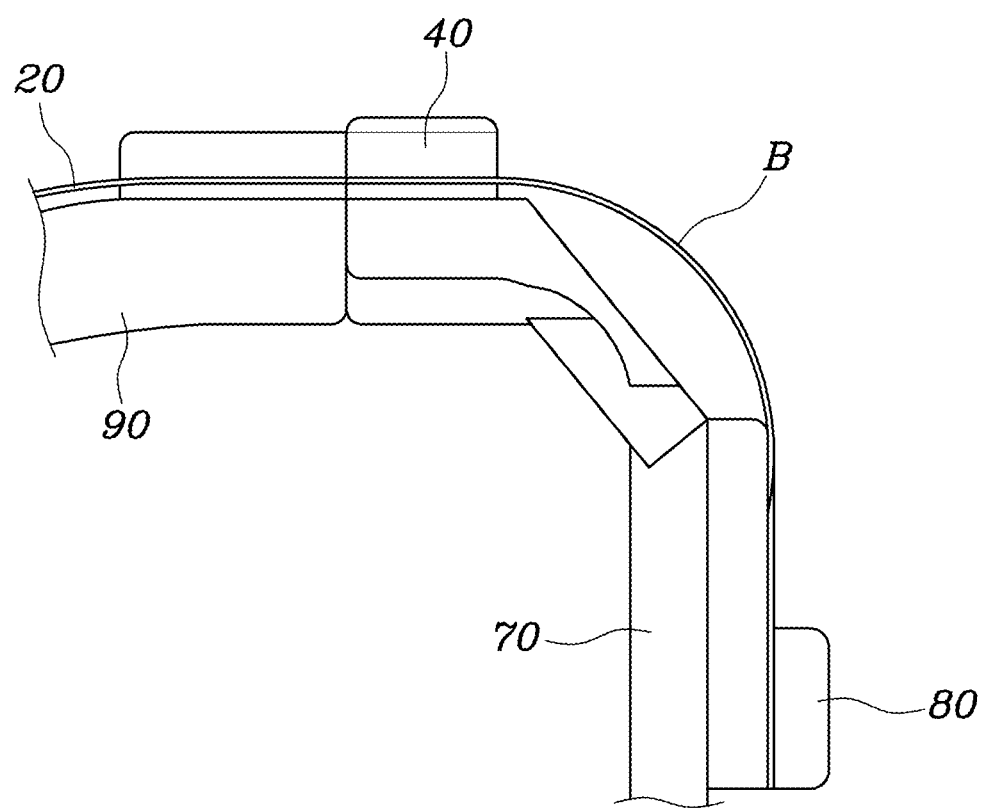
Figure 7:
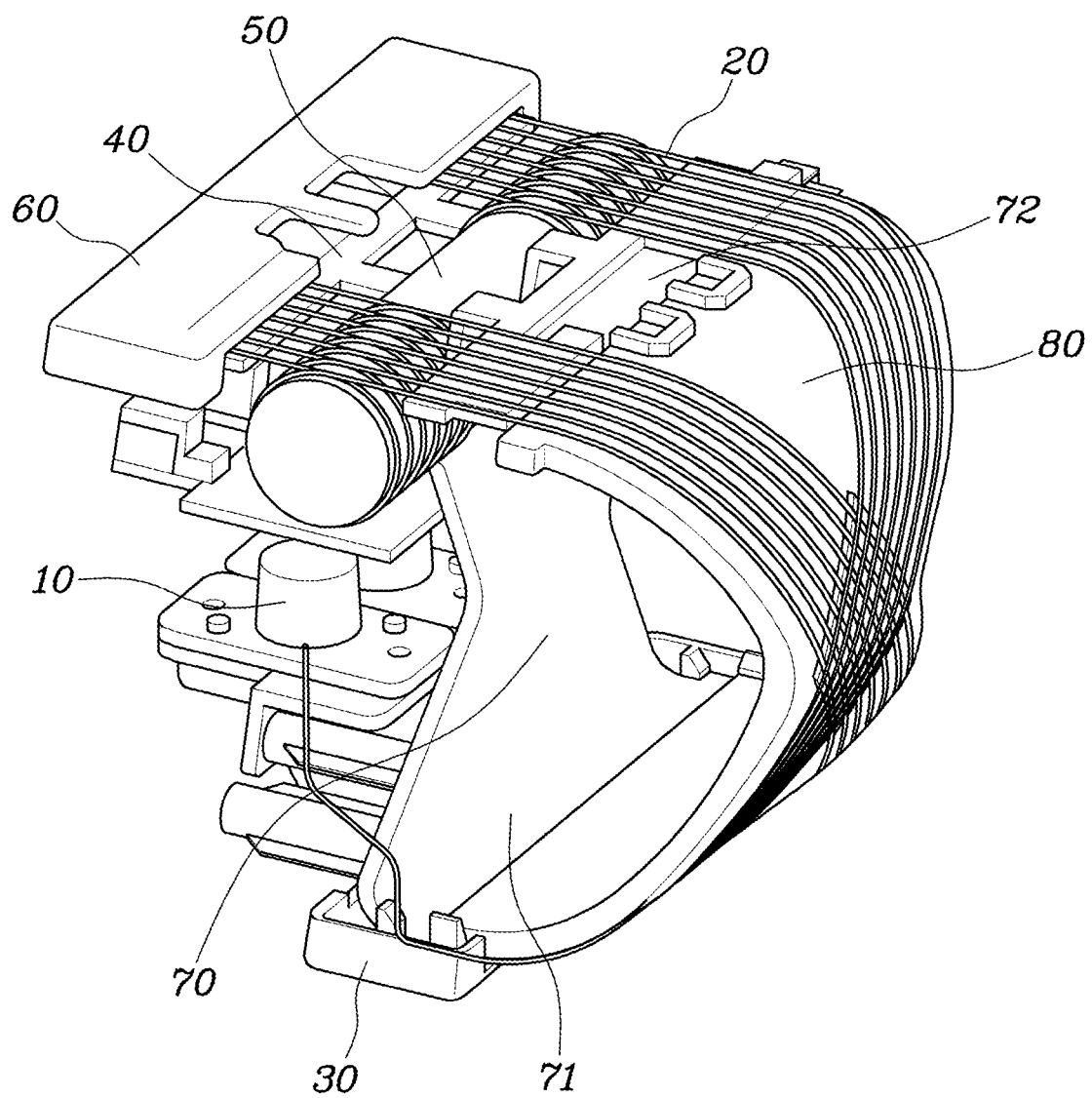
FIG. 7 is a diagram illustrating a lamp module with an optical fiber apparatus corresponding to an environmental condition according to various exemplary embodiments of the present invention.
Figure 8:
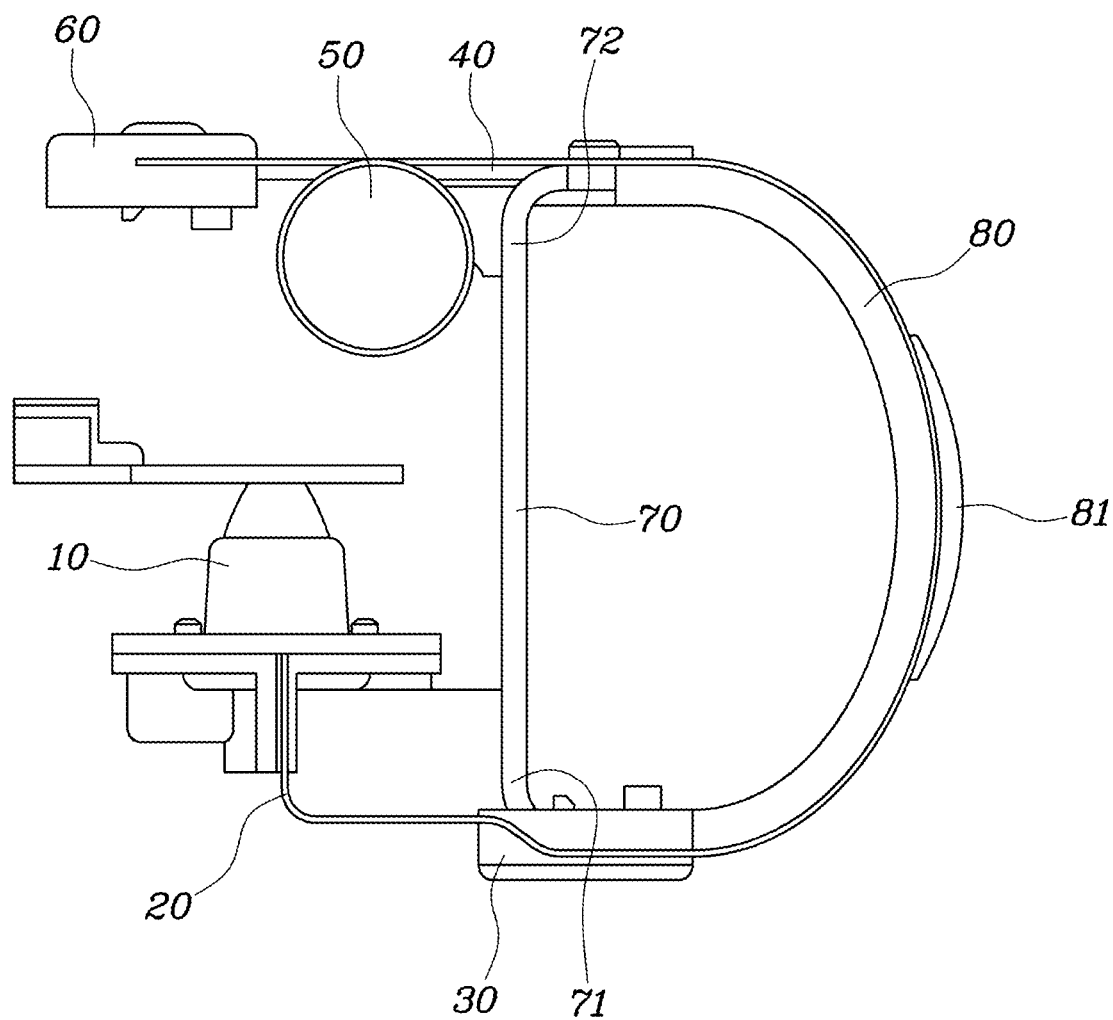
FIG. 8 is a diagram for explaining the lamp module with the optical fiber apparatus corresponding to the environmental condition illustrated in FIG. 7.
Figure 9:
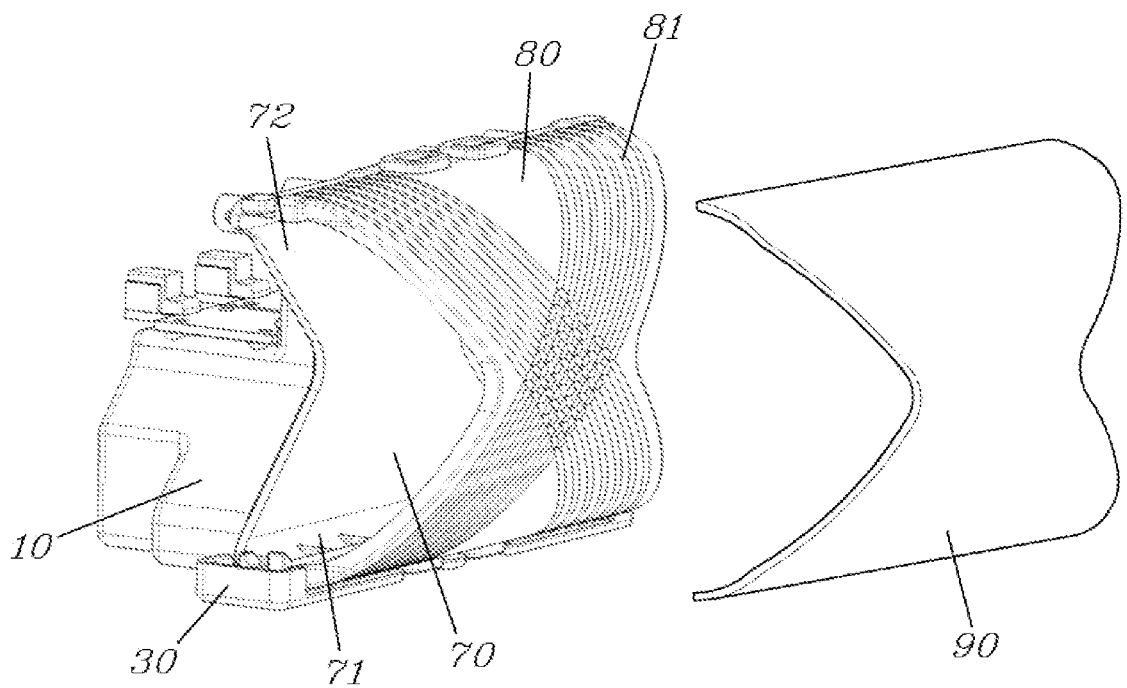
FIG. 9 and FIG. 10 are diagrams for explaining a support lens and a cover lens of the lamp module with the optical fiber apparatus corresponding to the environmental condition.
Figure 10:
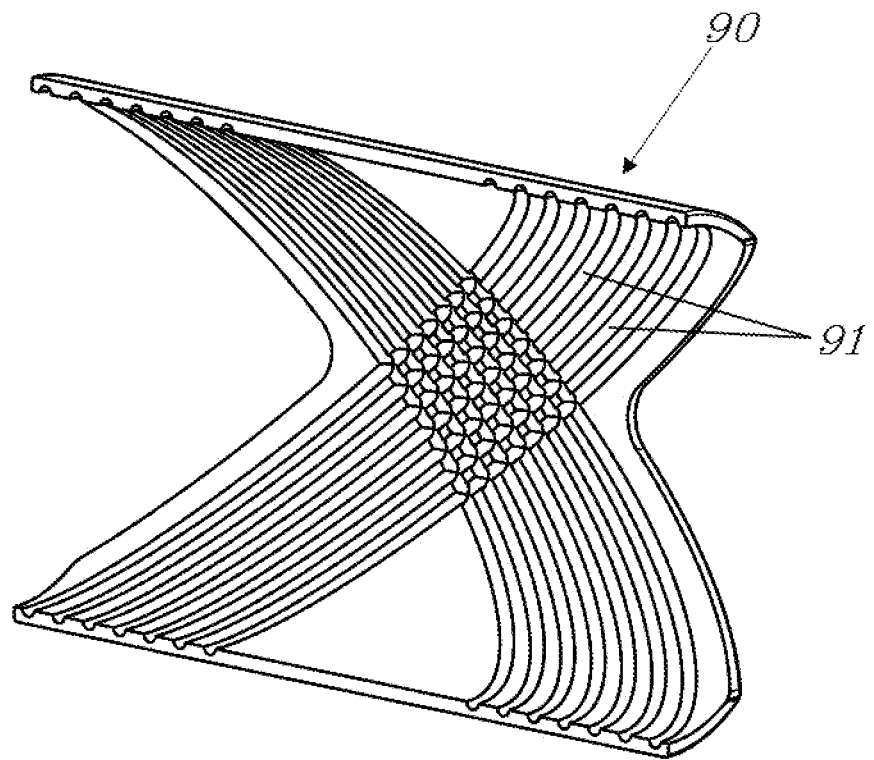

FIG. 1 is a diagram illustrating an optical fiber apparatus corresponding to an environmental condition according to various exemplary embodiments of the present invention, FIG. 2 and FIG. 3 are diagrams for explaining the optical fiber apparatus corresponding to the environmental condition illustrated in FIG. 1, FIG. 4 is a diagram illustrating a lamp module with the optical fiber apparatus corresponding to the environmental condition according to various exemplary embodiments of the present invention, FIG. 5 and FIG. 6 are diagrams for explaining the lamp module with the optical fiber apparatus corresponding to the environmental condition illustrated in FIG. 4, FIG. 7 is a diagram illustrating a lamp module with an optical fiber apparatus corresponding to an environmental condition according to various exemplary embodiments of the present invention, FIG. 8 is a diagram for explaining the lamp module with the optical fiber apparatus corresponding to the environmental condition illustrated in FIG. 7, and FIG. 9 and FIG. 10 are diagrams for explaining a support lens and a cover lens of the lamp module with the optical fiber apparatus corresponding to the environmental condition.

As illustrated in FIG. 1, an optical fiber apparatus corresponding to an environmental condition according to various exemplary embodiments of the present invention includes an optical fiber 20 having one end portion connected to a light source 10 to emit light to an outside of the optical fiber when the light of the light source 10 is incident; a fixing joint 30 connected to one end portion of the optical fiber 20 to limit the behavior of the optical fiber 20, and having one side operating as a lighting invalid section (L1) and the other side operating as a lighting valid section (L2) with respect to a connection point in a lighting section (L) of the optical fiber 20; a guide joint 40 connected to the other end portion of the optical fiber 20 and allowing the optical fiber 20 to pass therethrough to permit the behavior of the optical fiber 20, and having one side operating as the lighting valid section (L2) and the other side operating as the lighting invalid section (L1) with respect to the connection point in the lighting section (L) of the optical fiber 20; and a bending induction portion 50 disposed in the lighting invalid section (L1) of the optical fiber 20 as one side of the fixing joint 30 or the other side of the guide joint 40, and configured to induce a bending deformation of the optical fiber 20 to absorb the stretch or contraction of the optical fiber 20 by outside environment.

Here, the light source 10 may adopt an LED, and as the light radiated from the light source 10 is transferred to the optical fiber 20, the optical fiber 20 emits light. The optical fiber 20 is made of a glass or a polymer-based resin to form flexibility, and formed such that bending deformation is made of and the form is restored. A location of the optical fiber 20 needs to be fixed to implement the lighting image, and to this end, the fixing joint 30 and the guide joint 40 are provided therein.

Here, the fixing joint 30 is connected to one end portion of the optical fiber 20 to limit the behavior of the optical fiber 20, and the guide joint 40 is connected to the other end portion of the optical fiber 20 to fix the location of the optical fiber 20 such that the lighting image is fixed, and configured to allow the behavior with a predetermined distance. As the location of the optical fiber 20 is fixed by the fixing joint 30 and the guide joint 40, the lighting section (L) is classified into the lighting invalid section (L1) and the lighting valid section (L2). That is, the optical fiber 20 emits light in the entire region, but is fixed through the fixing joint 30 and the guide joint 40 such that the region in which light is emitted to the outside is limited. Therefore, one side of the connection point to which the fixing joint 30 is connected and the other side of the connection point to which the guide joint 40 is connected are operated as the lighting invalid section (L1) such that the optical fiber 20 does not emit light to the outside in the corresponding section, and the other side of the connection point to which the fixing joint 30 is connected and one side of the connection point to which the guide joint 40 is connected are operated as the lighting valid section (L2) such that the light generated in the corresponding section is emitted.

The present invention has the bending induction portion 50 mounted in the lighting invalid section (L1) of the optical fiber 20 as one side of the fixing joint 30 or the other side of the guide joint 40, and configured to induce a bending deformation of the optical fiber 20 to absorb the stretch or contraction of the optical fiber 20 by outside environment. The bending induction portion 50 is disposed in the lighting invalid section (L1) of the optical fiber 20 to avoid affecting the light emitted through the lighting valid section (L2) of the optical fiber 20. Therefore, the bending induction portion 50 is mounted on one side of the fixing joint 30 or the other side of the guide joint 40 to induce a bending deformation of the optical fiber 20 in the lighting invalid section (L1). As a result, the optical fiber 20 is wound around the bending induction portion 50 one or more times, facilitating bending deformation.

Here, the optical fiber 20 has one end portion fixed by the fixing joint 30, and the other end portion fixed by a fixation joint 60 through the guide joint 40 such that one end portion and the other end portion of the optical fiber 20 are fixed such that only the bending deformation by the bending induction portion 50 occurs.

Therefore, even if the optical fiber 20 is stretched by a high temperature condition, or contracted by a low temperature condition, a change in the length of the optical fiber 20 according to stretch or contraction in the lighting invalid section (L1) of the optical fiber 20 is absorbed through the bending deformation by the bending induction portion 50, preventing damage due to the change in the length of the optical fiber 20 and implementing the lighting image first designed.

Furthermore, the optical fiber 20 is loosely wound around the bending induction portion 50 when being wound therearound, and thus wound so that a separation space (A) is formed with respect to the bending induction portion 50. Furthermore, the bending induction portion 50 is formed in a circular shape such that the optical fiber 20 maintains the circular shape when being wound around the bending induction portion 50, minimizing damage to be generated upon contact between the optical fiber 20 and the bending induction portion 50. That is, the optical fiber 50 is wound around the bending induction portion 50 such that the separation space (A) is formed upon winding to absorb the change in the length caused upon contraction of the optical fiber 20. The separation space (A) between the optical fiber 20 and the bending induction portion 50 is secured greater than the length changed upon contraction of the optical fiber 20, smoothly responding to the change in the length of the optical fiber 20. Furthermore, the bending induction portion 50 may adopt various forms in which the optical fiber 20 may be wound, but formed in a circular shape, inducing the optical fiber 20 to be naturally wound and unwound according to the form of the bending induction portion 50.

As describe above, as illustrated in FIG. 1, the optical fiber 20 according to various exemplary embodiments of the present invention has one end portion fixed by the fixing joint 30, and the other end portion fixed in location in a form of a lighting image desired to be implemented through the guide joint 40 and the fixation joint 60. Here, although it has been illustrated that the bending induction portion 50 is provided in the lighting invalid section (L1) of the other side of the guide joint 40, the bending induction portion 50 may also be provided in the lighting invalid section (L1) of one side of the fixing joint 30.

Here, when the optical fiber 20 is stretched by the high temperature condition, as illustrated in FIG. 2, the optical fiber 20 is unfolded by a stretched length such that the separation space (A) for the bending induction portion 50 becomes large, absorbing the change in the length of the optical fiber 20. Conversely, even if the optical fiber 20 is contracted by the low temperature condition, as illustrated in FIG. 3, the optical fiber 20 is contracted by a contracted length such that the separation space (A) for the bending induction portion 50 becomes small, absorbing the change in the length of the optical fiber 20.

This may be implemented by an elastic restoring force by the material property of the optical fiber 20, and the change in the length of the optical fiber 20 is absorbed by the change in the shape through the bending induction portion 50, preventing damage to the optical fiber 20.

As described above, the optical fiber 20 has one end portion connected to the light source 10 and fixed by the fixing joint 30, and the edge portion of the other end portion fixed by the fixation joint 60 such that the location thereof is fixed in a form of the lighting image desired to be implemented. The optical fiber 20 may be wound around the bending induction portion 50 provided in the lighting invalid section (L1), absorbing the change in the length of the optical fiber 20 by the bending induction portion 50 in the lighting invalid section (L1) upon stretch or contraction by the outside environment, and implementing the lighting image with the light emitted through the lighting valid section (L2).

Meanwhile, as illustrated in FIG. 4, a lamp module with the optical fiber apparatus corresponding to the environmental condition according to various exemplary embodiments of the present invention includes a bracket 70 having one end portion 71 and the other end portion 72 spaced from each other, and the light source 10 configured to radiate light to the one end portion 71 provided therein; the optical fiber 20 having one end portion connected to the light source 10 to emit the light radiated from the light source 10; the fixing joint 30 provided on the one end portion 71 of the bracket 70 and connected to one end portion of the optical fiber 20 to limit the behavior of the optical fiber 20, and having one side operating as the lighting invalid section (11) and the other side operating as the lighting valid section (L2) with respect to the connection point in the lighting section (L) of the optical fiber 20; the guide joint 40 provided on the other end portion 72 of the bracket 70 and connected so that the other end portion of the optical fiber 20 passes therethrough to permit the behavior of the optical fiber 20, and having one side operating as the lighting valid section (L2) and the other side operating as the lighting invalid section (L1) with respect to the connection point in the lighting section (L) of the optical fiber 20; and the bending induction portion 50 disposed in the lighting invalid section (L1) of the optical fiber 20 on the one end portion 71 or the other end portion 72 of the bracket 70, and configured to induce a bending deformation of the optical fiber 20 to absorb stretch or contraction of the optical fiber 70 by the outside environment.

Here, the bracket 70 may be provided on a place in which lighting is needed in a vehicle, and provided with the light source 10 configured to radiate light and a light source module relevant thereto. The bracket 70 has the one end portion 71 and the other end portion 72 spaced from each other, and has the light source 10 provided on the one end portion 71 which is any one end portion thereof. The location of the light source 10 may be provided on any of the one end portion 71 and the other end portion 72 of the bracket 70, and if the light source 10 is provided on the one end portion 71 of the bracket 70, the fixing joint 30 may be provided together with the one end portion 71 of the bracket 70, and the guide joint 40 may be provided on the other end portion 72 of the bracket 70.

Here, the fixing joint 30 is connected to one end portion of the optical fiber 20 to limit the behavior of the optical fiber 20, and the guide joint 40 is connected to the other end portion of the optical fiber 20 to fix the location of the optical fiber 20 such that the lighting image is fixed and the guide joint 40 is configured to allow the behavior of a predetermined distance.

As the location of the optical fiber 20 is fixed by the fixing joint 30 and the guide joint 40, the lighting section (L1) is classified into the lighting invalid section (L1) and the lighting valid section (L2). That is, the optical fiber 20 emits light in the entire region, but is fixed by the fixing joint 30 and the guide joint 40 such that the region in which light is emitted to the outside is limited. Therefore, since one side of the connection point to which the fixing joint 30 is connected and the other side of the connection point to which the guide joint 40 is connected are operated as the lighting invalid section (L1), the light is not emitted to the outside in the corresponding section, and since the other side of the connection point to which the fixing joint 30 is connected and one side of the connection point to which the guide joint 40 is connected are operated as the lighting valid section (L2), the light generated in the corresponding section is emitted to the outside.

Here, the present invention is provided with the bending induction portion 50 disposed in the lighting invalid section (L1) of the optical fiber 20 as one side of the fixing joint 30 or the other side of the guide joint 40, and configured to induce a bending deformation of the optical fiber 20 to absorb stretch or contraction of the optical fiber 20 by the outside environment. The bending induction portion 50 is disposed in the lighting invalid section (L1) of the optical fiber 20 to avoid affecting the light emitted through the lighting valid section (L2) of the optical fiber 20. Therefore, the bending induction portion 50 is disposed on one side of the fixing joint 30 or the other side of the guide joint 40 to induce a bending deformation of the optical fiber 20 in the lighting invalid section (L1).

Therefore, the present invention absorbs the change in the length of the optical fiber 20 as the optical fiber 20 is bent and deformed by the bending induction portion 50 when the optical fiber 20 is changed in length by the high temperature or low temperature environmental condition, preventing damage due to the change in the length of the optical fiber 20 to improve durability.

Meanwhile, the optical fiber 20 is composed of a number of bundles, and the respective optical fibers 20 may cross each other, extend in the same direction thereof, or curvedly extend, implementing a lighting image.

In FIG. 4, the optical fiber 20 has a number of bundles tied in two, and as the respective bundles cross each other, the lighting image having an 'X' form is implemented. Furthermore, if the respective optical fibers 20 extend in the same direction, the lighting image having repeated vertical patterns may be implemented, and as the respective optical fibers 20 extend curvedly, the lighting image having specific patterns may be implemented. As described above, the present invention may implement various lighting images by changing the extending directions and the fixed locations of the optical fibers 20.

Meanwhile, the bending induction portion 50 configured to absorb the change in the length of the optical fiber 20 may be configured in various exemplary embodiments according to various exemplary embodiments of the present invention.

As various exemplary embodiments of the present invention, the bending induction portion 50 is mounted to be diagonally spaced from the guide joint 40 on the other end portion 72 of the bracket 70 and the other end portion of the optical fiber 20 is fixed such that the other end portion of the optical fiber 20 is curvedly bent and deformed.

As illustrated in FIG. 5 and FIG. 6, the other end portion 72 of the bracket 70 is provided with the guide joint 40 and the other end portion of the optical fiber 20 passes through the guide joint 40, and the bending induction portion 50 disposed to be diagonally spaced from the guide joint 40 fixes the other end portion of the optical fiber 20.

The bending induction portion 50 is disposed to be diagonally spaced from the guide joint 40 such that the other end portion of the optical fiber 20 is bent curvedly. As described above, as the other end portion of the optical fiber 20 is bent, the change in the length of the optical fiber 20 may be absorbed through the deformation of a bent portion (B).

One end portion of the optical fiber 20 is connected to the light source 10 on the one end portion 71 of the bracket 70 and fixed by the fixing joint 30. The other end portion of the optical fiber 20 is fixed to the bending induction portion 50 located diagonally through the guide joint 40, becoming the bent state. That is, the other end portion of the optical fiber 20 becomes a state of being bent by the bending induction portion 50 to be deformable, and the change in the length thereof is absorbed by the deformation of the bent portion (B) upon stretch or contraction of the optical fiber 20.

Here, even if the optical fiber 20 is contracted by the outside environment, the bent portion (B) by the bending induction portion 50 may be provided to be spaced from the bracket 70. As illustrated in FIG. 6, the optical fiber 20 is bent by the guide joint 40 and the bending induction portion 50, and even if the optical fiber 20 is contracted upon installation of the optical fiber 20, the bent portion (B) by the bending induction portion 50 may be spaced from the bracket 70, smoothly performing the deformation of the optical fiber 20 and avoiding damage caused by contacting with the bracket 70.

Meanwhile, as illustrated in FIGS. 7 and 8, another exemplary embodiment further includes the fixation joint 60 provided to be spaced from the guide joint 40 in the other end direction of the optical fiber 20 on the other end portion 72 of the bracket 70 and connected to the other end portion of the optical fiber 20 to limit the behavior of the optical fiber 20, and the bending induction portion 50 may be provided such that the optical fiber 20 is wound, and thus the optical fiber may be bent and deformed.

That is, one end portion of the optical fiber 20 is fixed by the fixing joint 30 on the one end portion 71 of the bracket 70, and the other end portion thereof is fixed by the fixation joint 60 through the guide joint 40 such that the location thereof is fixed in a form of a lighting image desired to be implemented. In FIGS. 7 and 8, although it has been illustrated that the bending induction portion 50 is provided between the guide joint 40 and the fixation joint 60, the bending induction portion 50 may be provided between the light source 10 and the fixing joint 30. As described above, as the optical fiber 20 is wound around the bending induction portion 50, the change in the length of the optical fiber 20 may be absorbed.

Here, the bending induction portion 50 may be formed in a circular shape, and the optical fiber 20 may be wound around the bending induction portion 50 to have the separation space (A) with respect to the bending induction portion 50.

As described above, the change in the length of the optical fiber 20 is absorbed by the separation space (A) generated when being wound around the bending induction portion 50 even if the stretch or contraction thereof occurs.

As described above, the optical fiber 20 has one end portion connected to the light source 10 and fixed by the fixing joint 30, and the edge portion of the other end portion fixed by the fixation joint 60 such that the location thereof is fixed in a form of the lighting image desired to be implemented. The optical fiber 20 passes through the guide joint 40 and is wound around the bending induction portion 50, being movable in the guide joint 40.

Therefore, when being stretched by the high temperature condition, the optical fiber 20 is unfolded by a stretched length of the optical fiber 20 such that the separation space (A) for the bending induction portion 50 becomes large, absorbing the change in the length of the optical fiber 20. Conversely, when being contracted by the low temperature condition, the optical fiber 20 is contracted by a contracted length of the optical fiber 20 such that the separation space (A) for the bending induction portion 50 becomes small, absorbing the change in the length of the optical fiber 20. This may be implemented by an elastic restoring force by the material property of the optical fiber 20, and the change in the length of the optical fiber 20 is absorbed by a change in the shape through the bending induction portion 50, preventing damage to the optical fiber 20.

Meanwhile, as illustrated in FIG. 9, the present invention may further include a support lens 80 mounted through the one end portion 71 and the other end portion 72 of the bracket 70 to support the optical fiber 20 and formed with a seating portion 81 having the optical fiber 20 accommodated thereon to fix a location of the optical fiber 20.

As described above, the bracket 70 is provided with the support lens 80 on which the optical fiber 20 is accommodated such that the lighting image through the optical fiber 20 may be fixed. To this end, the support lens 80 may be formed with the seating portion 81 configured to fix the location of the optical fiber 20. The seating portion 81 may include a groove, and the optical fiber 20 may be inserted into the seating portion 81 and the location thereof may be fixed. Furthermore, as the support lens 80 supports the optical fiber 20, tension is applied to the optical fiber 20 and thus the location of the optical fiber 20 may be securely fixed, implementing the consistent lighting image.

Meanwhile, as illustrated in FIG. 10, the present invention may further include a cover lens 90 mounted on the bracket 70 to cover the support lens 80 and configured so that the light is transmitted therethrough. When being mounted on the bracket 70, the cover lens 90 covers the optical fiber 20 together with the support lens 80 such that the optical fiber 20 is prevented from being damaged due to contamination or shock by the permeation of foreign substances. Furthermore, the cover lens 90 may be transparently configured so that the light emitted from the optical fiber 20 is projected to the outside.

The cover lens 90 may have a support portion 91 formed on the cross section thereof facing the support lens 80, the support portion fixing the location of the optical fiber 20 while surrounding the optical fiber 20 together with the seating portion 81. When the cover lens 90 is provided on the bracket 70, the support portion 91 may be formed to face the seating portion 81 of the support lens 80, and including a protrusion or a groove such that the optical fiber 20 may be fixed by the support portion 91. As described above, as the location of the optical fiber 20 is securely fixed by the cover lens 90, the lighting image through the optical fiber 20 is not deformed, and the consistent lighting image may be implemented.

According to the optical fiber apparatus corresponding to the environmental condition composed of the aforementioned structure and the lamp module with the optical fiber apparatus corresponding to the environmental condition, the movement of the optical fiber is guided upon the change in the length of the optical fiber by the high temperature or low temperature environmental condition to absorb the change in the length of the optical fiber, preventing damage due to the change in the length of the optical fiber to improve durability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An optical fiber apparatus comprising:
   an optical fiber having a first end portion connected to a light source to emit light to an outside of the optical fiber when the light of the light source is incident on the first end portion of the optical fiber;
   a fixing joint connected to a first mid portion of the optical fiber to limit a movement of the optical fiber, and having a first side operating as a lighting invalid section and a second side operating as a lighting valid section with respect to a connection point in a lighting section of the optical fiber;
   a guide joint connected to a second mid portion of the optical fiber and allowing the optical fiber to pass therethrough to permit the movement of the optical fiber, and having one side operating as the lighting valid section and another side operating as the lighting invalid section with respect to the connection point in the lighting section of the optical fiber; and
   a bending induction portion disposed in the lighting invalid section of the optical fiber as the first side of the fixing joint or another side of the guide joint, and configured to induce a bending deformation of the optical fiber to absorb stretch or contraction of the optical fiber by an outside environment.

2. The optical fiber apparatus of claim 1, further including a fixation joint spaced from the guide joint toward a second end portion of the optical fiber and connected to the second end portion of the optical fiber to limit the movement of the optical fiber,
   wherein the bending induction portion is provided so that the optical fiber is wound to bend and deform the optical fiber.

3. The optical fiber apparatus of claim 2,
   wherein the optical fiber is wound around the bending induction portion so that a separation space is formed between the optical fiber and the bending induction portion.

4. The optical fiber apparatus of claim 2,
   wherein the bending induction portion is formed in a circular shape.

5. The optical fiber apparatus of claim 2,
   wherein the bending induction portion is mounted between the guide joint and the fixation joint.

6. A lamp module comprising:
   a bracket having a first end portion and a second end portion formed to be spaced from each other, and having a light source;
   an optical fiber having a first end portion connected to the light source to emit light to an outside of the optical fiber when the light of the light source is incident on the first end portion of the optical fiber;
   a fixing joint provided on the second end portion of the bracket and connected to the second end portion of the optical fiber to limit a movement of the optical fiber, and having a first side operating as a lighting invalid section and a second side operating as a lighting valid section with respect to a connection point in a lighting section of the optical fiber;
   a guide joint provided on the second end portion of the bracket and connected to allow the optical fiber to pass therethrough to permit the movement of the optical fiber, and having one side operating as the lighting valid section and another side operating as the lighting invalid section with respect to the connection point in the lighting section of the optical fiber; and
   a bending induction portion disposed in the lighting invalid section of the optical fiber on the first end portion or the second end portion of the bracket, and configured to induce a bending deformation of the optical fiber to absorb stretch or contraction of the optical fiber by an outside environment.

7. The lamp module of claim 6,
   wherein the optical fiber is in plural to form a plurality of optical fibers and to be composed of a number of bundles, and each of the plurality of optical fibers crosses each other, extends in a same direction, or extends curvedly, implementing a lighting image.

8. The lamp module of claim 6,
   wherein the bending induction portion is disposed to be diagonally spaced from the guide joint on the second end portion of the bracket and has the second end portion of the optical fiber fixed so that the second end portion of the optical fiber is curvedly bent and deformed.

9. The lamp module of claim 8,
   wherein when the optical fiber is contracted by the outside environment, a portion of the optical fiber bent by the bending induction portion is provided to be spaced from the bracket by the bending induction portion.

10. The lamp module of claim 6, further including a support lens mounted through the first end portion and the second end portion of the bracket to support the optical fiber and formed with a seating portion having the optical fiber accommodated thereon to fix a location of the optical fiber.

11. The lamp module of claim 10, further including a cover lens mounted on the bracket to cover the support lens and configured so that the light is transmitted therethrough.

12. The lamp module of claim 11,
   wherein the cover lens has a support portion formed on a cross section facing the support lens, the support portion fixing the location of the optical fiber while surrounding the optical fiber with the seating portion.

13. The lamp module of claim 6, further including a fixation joint provided to be spaced from the guide joint toward the second end portion of the optical fiber on the second end portion of the bracket and connected to the second end portion of the optical fiber to limit the movement of the optical fiber, wherein the bending induction portion is provided so that the optical fiber is wound to bend and deform the optical fiber.

14. The lamp module of claim 13, wherein the bending induction portion is formed in a circular shape, and has the optical fiber wound around the bending induction portion to have a separation space between the optical fiber and the bending induction portion.

15. The lamp module of claim 10, wherein the optical fiber is in plural to form a plurality of optical fibers, wherein the plurality of optical fibers is composed of a first bundle and a second bundle, and the plurality of optical fibers in the first bundle and the second bundle crosses each other at the seating portion.

* * * * *